Patented Jan. 9, 1923.

1,441,205

UNITED STATES PATENT OFFICE.

EMILE BINDSCHEDLER, OF PHILADELPHIA, PENNSYLVANIA, AND GEORGE JUER, OF HOPEWELL, VIRGINIA, ASSIGNORS TO TUBIZE ARTIFICIAL SILK COMPANY OF AMERICA, OF WILMINGTON, DELAWARE, A CORPORATION OF DELAWARE.

PROCESS OF MANUFACTURING ARTIFICIAL SILK AND OTHER PRODUCTS FROM NITROCELLULOSE.

No Drawing.　　　Application filed November 19, 1920.　Serial No. 425,050.

*To all whom it may concern:*

Be it known that we, EMILE BINDSCHEDLER, a citizen of the Republic of Switzerland, and resident of Philadelphia, in the county of Philadelphia, in the State of Pennsylvania, and GEORGE JUER, recently a subject of the former Austro-Hungarian Empire, and now resident of Hopewell, in the county of Prince George, in the State of Virginia, have invented certain new and useful Improvements in Processes of Manufacturing Artificial Silk and Other Products from Nitrocellulose, of which the following is a true and exact description.

Our invention relates to the manufacture of articles from nitrocellulose and particularly to the production of artificial silk. Heretofore it has been known that acetone and its homologues are solvents of nitrocellulose and that its or their use as such would be advantageous from the point of view of the comparatively easy and large percentage of their recovery from admixture with air compared with other solvents, the large losses of which more than offset their relative cheapness. It has been found, however, that acetone as heretofore attempted to be used, results in a cloudiness or opacity in the finished product made from the acetone collodion and, particularly, it is found that artificial silk so made is friable and without lustre.

The object of our invention is to provide a method of using acetone as a solvent for nitrocellulose and for recovering the nitrocellulose from solution after manufacture which will produce a lustrous and strong filament or other product and we accomplish this by dissolving nitrocellulose in acetone, forming by usual methods the desired product from the acetone collodion and removing the acetone solvent by immersing the product in a concentrated solution of a chemical with which acetone will form a chemical union and which will not affect the nitrocellulose. The concentrated solution of sodium bisulphite is exceedingly well adapted for the purpose and the acetone can be recovered from it by simply heating the compound with or without previous addition of alkali.

By preference we first dehydrate the nitrocellulose which can be conveniently done by treating it with ethylalcohol with which it may still be impregnated when brought into admixture with the acetone, and by preference also we use dry acetone as a solvent. This preferred process is not claimed in this application as it forms the subject matter of our copending application filed November 19, 1920, Serial No. 425,048. It will, of course, be understood that the well known homologues of acetone can be used as solvents and it is true that in place of using acetone or its homologues alone they can be used in admixture with other well known solvents such as ethylalcohol.

Having now described our invention, what we claim as new and desire to secure by Letters Patent, is:

1. The method of manufacturing clear unclouded products from nitrocellulose which consists in dissolving the nitrocellulose in a solvent made up in whole or in part of acetone or its homologues, imparting to the acetone collodion thus formed the desired form and extracting the solvent by immersing the formed product in a concentrated solution with which acetone will chemically react but which will not affect nitrocellulose.

2. The method of manufacturing clear unclouded products from nitrocellulose which consists in dissolving the nitrocellulose in a solvent made up in whole or in part of acetone or its homologues, imparting to the acetone collodion thus formed the desired form and extracting the solvent by immersing the formed product in a concentrated solution of sodium bisulphite with which acetone will chemically react but which will not affect nitrocellulose.

3. The method of manufacturing artificial silk filaments from nitrocellulose which consists in dissolving the nitrocellulose in a solvent made up in whole or in part of acetone or its homologues, forming the acetone collodion thus obtained into artificial silk filaments by forcing it through a spinnarette and extracting the solvent from the filaments by immersing them in a concentrated solution of a chemical with which acetone will react but which will not affect nitrocellulose.

EMILE BINDSCHEDLER.
GEORGE JUER.